United States Patent
Schneerson et al.

(10) Patent No.: US 6,426,856 B1
(45) Date of Patent: Jul. 30, 2002

(54) METHOD FOR MONITORING A PROTECTIVE GEAR

(75) Inventors: Eduard Schneerson, Fuerth; Thomas Liebach, Puschendorf, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/485,803

(22) PCT Filed: Jul. 29, 1998

(86) PCT No.: PCT/DE98/02162
§ 371 (c)(1),
(2), (4) Date: Oct. 20, 2000

(87) PCT Pub. No.: WO99/08356
PCT Pub. Date: Feb. 18, 1999

(30) Foreign Application Priority Data

Aug. 12, 1997 (DE) ..................... 297 14 298 U
Mar. 9, 1998 (DE) ..................... 198 10 044

(51) Int. Cl.[7] .............................................. H02H 7/26
(52) U.S. Cl. ............................. 361/79; 361/65; 361/80; 702/58
(58) Field of Search .................. 361/62, 65, 78, 361/79, 80, 88, 92; 324/102, 512, 103 R, 522; 702/57, 58, 64

(56) References Cited

U.S. PATENT DOCUMENTS

| 4,091,433 A | * | 5/1978 | Wilkinson | 361/76 |
| 4,296,451 A | * | 10/1981 | Wilkinson | 361/80 |
| 4,835,651 A | | 5/1989 | Li et al. | |
| 5,703,745 A | * | 12/1997 | Roberts et al. | 361/89 |
| 5,808,845 A | * | 9/1998 | Roberts | 361/79 |

FOREIGN PATENT DOCUMENTS

DE   22 64 064   7/1974

* cited by examiner

Primary Examiner—Kim Huynh
(74) Attorney, Agent, or Firm—Kenyon & Kenyon

(57) ABSTRACT

A method of operating a protective gear is described, in particular a remote protective gear for an electric power grid. In this method, a voltage signal is derived from the line voltage, and a current signal is derived from the line current. To guarantee reliable detection of a fault in the measurement circuit of protective gear, a voltage drop is gated with a current surge. A monitoring device provided for this purpose gates a first detection signal derived from the voltage signal for the voltage drop with a second detection signal derived from the current signal for the current surge. The monitoring function is suitable for both single-phase and multi-phase networks and permits a reliable differentiation between a network fault and a failure of the measuring circuit.

14 Claims, 4 Drawing Sheets

METHOD FOR MONITORING A PROTECTIVE GEAR

FIELD OF THE INVENTION

The present invention relates to a method of monitoring protective gear for an electric power grid, where a voltage signal is derived from the line voltage and a current signal is derived from the line current. The present invention also relates to a protective gear device operating according to this method. The term "protective gear device" is understood here to refer to a remote protective gear in particular.

BACKGROUND INFORMATION

A remote protective gear or a protective relay is generally used in a high-voltage grid or a medium-voltage grid of an electric power distribution system to detect defects in a protective object assigned to this remote protective gear, namely a protective section or line section. To do so, the remote protective gear detects current and voltage values for the line or section to be protected within the total network and calculates the corresponding impedance from it.

When a fault occurs, e.g., in the form of a short circuit within the line section monitored, the remote protective gear triggers a tripping signal, which activates a circuit-breaker which in turn isolates the corresponding line section from the total network. The remote protective gear is used to localize the fault by determining the distance between the fault and the corresponding measurement station on the basis of the impedance thus determined, where the distance from the fault decreases with a decrease in impedance.

The remote protective gear receives the current and voltage values over appropriate measuring transducers whose secondary current and voltage measuring circuits supply a current signal proportional to the operating current, i.e., the line current of the line to be protected or a voltage signal proportional to the line voltage. A protective or monitoring device, e.g., in the form of a computer or microprocessor, forms the impedance (Z) from the quotient of the voltage signal and the current signal, comparing this with a setpoint ($Z_{soll}$). If the measuring circuit voltage drops in the case of a short circuit or a line break, and thus the impedance also drops, the line segment monitored is shut down when the tripping criterion ($Z<Z_{soll}$) is met.

Occurrence of a fault in the measuring circuit, in particular failure of the voltage signal in the voltage measuring circuit (measuring circuit voltage failure) is problematical. Such a fault may occur, for example, due to a short circuit or a line break on the secondary side of the voltage transformer. Occurrence of such a fault leads to an unwanted shutdown of the object protected when the operating current is flowing; in other words, the line or line segment is shut down, because the tripping criterion is also met. In this case, the monitoring device may not differentiate between such a fault in the voltage measuring circuit and a line fault resembling a short circuit in the immediate vicinity of the remote protective gear, because in both cases the measuring circuit voltage is below a setpoint, or in the extreme case it may even be zero. In any case, the impedance derived from it is lower than the setpoint. For fault-free functioning of the remote protective gear, it is therefore necessary to guarantee an unambiguous differentiation between a line fault and a fault in the measuring circuit regardless of the type of network of the object to be protected.

If a protective switch is provided for the voltage transformer in the voltage measuring circuit, its circuit state can be used for analysis, e.g., by way of a binary input of the remote protective gear. A corresponding shutdown signal of the voltage transformer protective switch characterizes a short circuit in the voltage measuring circuit and can therefore be used to block the remote protective function. This prevents unwanted operation of the remote protective gear when there is a fault similar to a short circuit in the voltage measuring circuit. One disadvantage of this is that only a portion of the possible faults in the measurement circuit can be detected with such a method. For example, a line break in the measurement circuit cannot be detected.

With a three-phase grounded network, there is the possibility of monitoring the zero voltage and zero current. A suitable monitoring device would then block the remote protective function when an adjustable zero voltage limit value is exceeded and no zero current occurs at the same time. One disadvantage of such a method is its restricted applicability, especially since this principle is unfavorable in single-phase networks and in networks with an ungrounded neutral point.

In addition, this method has a faulty response to three-pole interruptions in the voltage measuring circuit because the remote protective gear is unintentionally tripped due to the lack of a zero voltage in this case. In a digital remote protective gear, blocking of the protective function in a measuring circuit voltage failure is often automatically associated with activation of an emergency protective function, preferably a time-overcurrent protective function.

SUMMARY

An object of the present invention is to provide a method of operating a protective gear with which reliable detection of a fault in the measurement circuit of the protective gear is guaranteed, in particular a measuring circuit voltage failure in the voltage measuring circuit of a remote protective gear. With a protective gear that operates according to this method, unwanted operation due to a measuring circuit voltage failure should be reliably prevented.

According to the present invention, a logic operation is performed on a detected voltage drop and a detected current surge. By appropriate analysis of the current and voltage signals and performing a logic operation on them, this ensures reliable differentiation between a line fault and a failure in the measurement circuit, in particular in the voltage measuring circuit of a remote protective gear. On the other hand, this reliably prevents a tripping time delay in the case of a fault in the monitored line segment, in particular a line short circuit.

When a current surge is detected, this indicates a line fault or a network fault. The logic operation of a first detection signal characterizing the voltage drop with a second detection signal characterizing the current surge does not result in blockage of the protective function of the protective gear. This reliably avoids failure of the protective gear to trip, so the protective gear can still shut down a possible short circuit in the network.

By monitoring the voltage signal and thus the line voltage to detect when it falls below a predefinable threshold, a tripping signal or an output signal for blocking the protective gear is optionally delivered when no current surge has been detected and the current signal has not fallen below a lower current limit and has not exceeded an upper current limit. Thus, unwanted operation of the protective gear is also safely prevented.

To do so, the second detection signal derived from the criterion of the current surge is extended in time and inverted, and a logic operation is performed between the resulting signal and the first detection signal derived from the criterion of the voltage drop. At the same time, the current signal is compared with a lower-threshold value, i.e., with a lower current limit, and a logic operation is performed between a third detection signal derived from this comparison and the second detection signal. In addition, the current signal is advantageously compared with an upper threshold value, i.e., an upper current limit, and a logic operation is performed between a fourth detection signal derived from this comparison and the first and second detection signals. Thus, line breaks in the measurement circuit, in particular in the voltage measuring circuit, are also detected, and unwanted tripping of the protective function is prevented.

If the value of the monitored current signal is outside predefinable current limits, generation of an output signal and thus blockage of the protective function in general are prevented. Consequently, the protective function is always in effect when large currents in the short-circuit current range occur. Threshold monitoring with generation of corresponding detection signals thus prevents unwanted blocking of the protective function in the event of a network short circuit. In addition, the protective function and thus the remote protection are generally in effect at very low current signal levels and are neither blocked nor deactivated by the monitoring. The de-energized condition of the system, i.e., of the line, is also taken in account.

In an one example embodiment of the present invention, the output signal generated on the basis of the detection signals is used to block the protective gear or the remote protective function as well as to activate an emergency protective function. The malfunction or trouble in the protective gear detected on the basis of this criterion is then advantageously reported during a predefinable period of time. As soon as the voltage signal exceeds a threshold value assigned to it or the current signal drops below a threshold value assigned to it, the output signal generated on the basis of the detection signals to block the protective gear is deactivated again. Thus, the monitoring resumes its initial status when the voltage recovery is detected or the value of the current signal drops below a minimum current limit.

This method is suitable for a single-phase network, a two-phase network or a three-phase network with a grounded neutral point. The current surge is detected as a function of phase or based on phase. To monitor a three-phase network with an insulated or compensated neutral point, the neutral displacement voltage is preferably also included in the logic operation. To do so, another detection signal is generated on the basis of a comparison of the neutral displacement voltage with a threshold value and then gated with at least the first and second detection signals. Monitoring is in effect then only when the adjustable threshold is not exceeded by the detected instantaneous displacement voltage.

According to the present invention, the protective gear includes a monitoring device connected to a measurement circuit for converting the line current or operating current and the network voltage into proportional current and voltage signals and generating a tripping criterion or an output criterion from the voltage signal and the current signal for blocking the protective gear by using a number of logic elements. To do so, a first AND element is provided for gating a first detection signal derived from the current signal with a second detection signal generated from the voltage signal. A (fourth) detection signal derived from a deviation in the current signal from an upper threshold value is preferably sent to the first AND element over a comparator or flip-flop element.

In addition, a second AND element may be provided upstream from the link between the first detection signal and a (third) detection signal derived from a deviation in the current signal from a lower threshold value. A timer which is in turn provided upstream from the second AND element is also used to provide an expansion of the second detection signal and thus the current surge in time. After detection of a current surge, a timer module is started in the monitoring device by the timer, preventing output of an output signal for blocking the protective gear until a predetermined period of time has elapsed. This period of time may be longer than the longest grading time of the protective gear in order to reliably block the monitoring device in the event of a short circuit.

To maintain the output criterion for blocking the protective gear even when all other criteria for blocking the protective gear except the current surge criterion are met, the output of the first AND element is connected to one of its inputs via an OR element which in turn receives at the its input the second detection signal for a current surge. This ensures that the output signal also remains active with timing of the current surge as long as a measurement circuit fault is still detected. The output signal is preferably sent over a second timing element to generate an alarm signal indicating the respective fault.

The advantages achieved with the present invention include in particular the fact that reliable monitoring of protective gear, in particular remote protective gear, is possible without any restriction on fast response time due to a logic operation performed on a detected voltage drop and a detected current surge. This monitoring permits reliable differentiation between a system fault and a line fault, i.e., a fault in the protective object monitored, and a fault in the measurement circuit of the protective gear, in particular because of a short circuit or a line break in the voltage measuring circuit. This reliably prevents a delay in trip time in the event of a short circuit in the network or line. The method described here and the corresponding protective gear are thus suitable both for single-phase and multi-phase network systems, preventing unwanted operation of the protective gear as well as failure to trip. An example application is for remote protection, e.g.. in railway technology.

DETAILED DESCRIPTION

Corresponding parts in all the figures are labeled with the same reference numbers.

Figure 1:
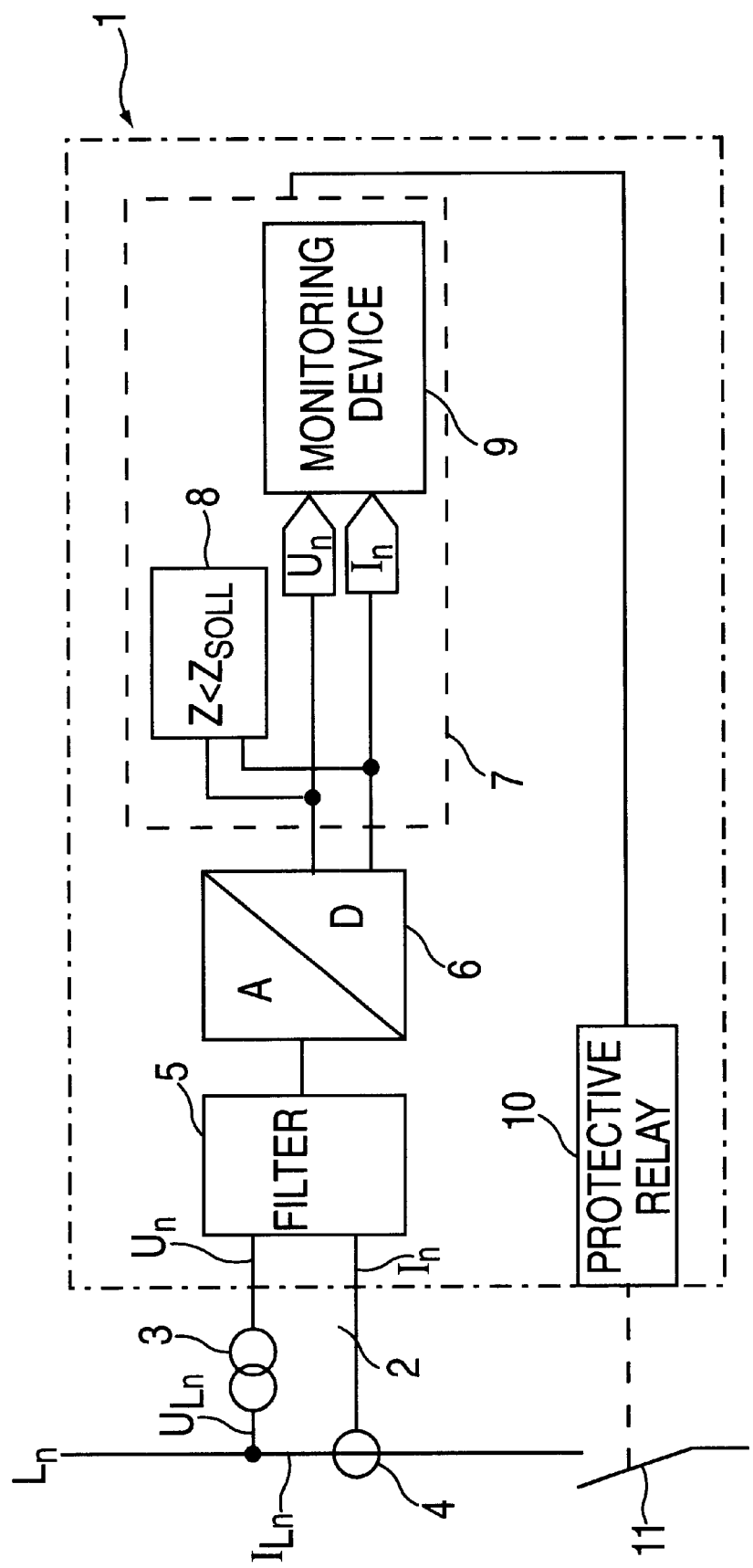
FIG. 1 shows a schematic view of a protective gear having a monitoring device.

FIG. 1 schematically shows a protective relay or remote protective gear 1 as a protective device for a single-phase or multi-phase electric conductor system having a number of lines or line segments $L_n$ corresponding to the number of phases. A voltage signal $U_n$ proportional to line voltage $U_{Ln}$ of the respective phase $L_1 \ldots _n$ and a current signal $I_n$ proportional to the line current or operating current $I_{Ln}$ in this line segment $L_n$ are sent to remote protective gear 1 over a measurement circuit 2 having a voltage transformer 3 and a current transformer 4.

These signals $U_n$, $I_n$ are sent via a filter 5 of measurement circuit 2 within remote protective gear 1 to an analog-digital converter 6, which converts analog signals $U_n$, $I_n$ into digital signals. Digitized signals $U_n$, $I_n$ are sent to an impedance stage 8 and a monitoring device 9 in a computer or microprocessor 7. The output of computer 7 is connected to an output relay or protective relay 10 which is in turn connected to a circuit-breaker 11 in line $L_n$ to be protected.

Impedance stage 8 of computer 7 forms the quotient of voltage signal $U_n$ and current signal $I_n$ and compares impedance Z thus determined with a predefined limit value $Z_{soll}$. If tripping criterion $Z<Z_{soll}$ is met, relay 10 is activated and circuit breaker 11 is opened. By means of this protective function, a corresponding line section $L_n$ is isolated from the overall electric network in the event of a network short circuit. This tripping criterion is also met when the fault, i.e., a short circuit or a break, occurs in measurement circuit 2 between transformers 3, 4 and the processing stages, e.g., filter 5, analog-digital converter 6 or computer 7 of remote protective gear 1.

To detect such faults in measurement circuit 2 in particular in the voltage measuring circuit for generating a voltage signal $U_n$, monitoring device 9 analyzes voltage signal $U_n$ (measuring circuit voltage signal) and current signal $I_n$ (current measuring circuit signal) by a logic link. This analysis guarantees a reliable differentiation between a network or system fault and a failure in measuring circuit 2.

Figure 2:
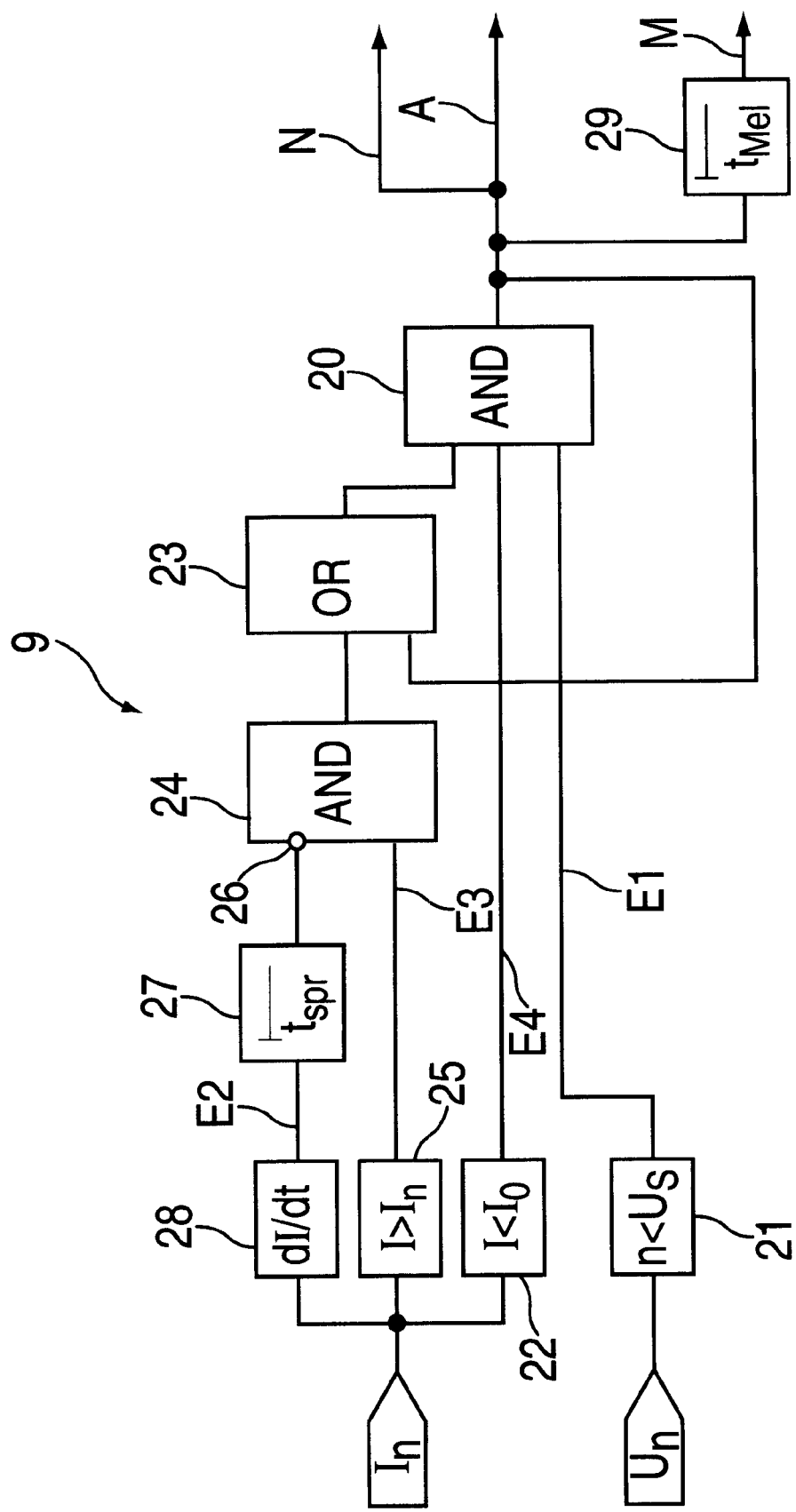
FIG. 2 shows the monitoring device for a single-phase network.

FIG. 2 illustrates the manner in which voltage signal $U_n$ and current signal $I_n$ are gated for a single-phase network. To do so, monitoring device 9 has a first AND element 20 connected at the input to a first flip-flop 21 for comparison of voltage signal $U_n$ with a first threshold value $U_s$. In addition, AND element 20 is connected at the input to a second flip-flop 22 for comparing current signal $I_n$ with an upper threshold value or an upper current limit $I_o$. Furthermore, AND element 20 is connected by an OR element 23 to a second AND element 24, which is in turn connected at the input to a third flip-flop 25 for comparing current signals $I_n$ with a lower threshold value or a lower current limit $I_u$.

An inverting input 26 of second AND element 24 is connected via a first timing element 27 to a differentiator 28 to form differential quotient dI/dt of current signal $I_n$. A sudden change in current dI (current surge) is detected by differentiating element 28 within a defined interval of time dt. The output of first AND element 20 is connected to the input of OR element 23 and to a second timer 29.

In operation of protective gear 1, voltage signal $U_n$ derived from line voltage $U_{Ln}$ is first compared with adjustable threshold value $U_s$ in flip-flop 21. As a result of this comparison, a first detection signal E1 is sent to first AND element 20 in the form of a binary code. As long as voltage signal $U_n$ exceeds threshold value $U_s$, the input of AND element 20 assigned to detection signal E1 is a logical "0." By analogy, current signal $I_1$ derived from operating current $I_{Ln}$ is compared in flip-flop 22 with upper current limit $I_o$, and a (fourth) detection signal E4 derived from it is in turn sent in the form of binary code to AND element 20. As long as current signal $I_n$ is below this upper current limit $I_o$, detection signal E4 sends a logical "1" to AND element 20. Current signal $I_n$ is monitored by flip-flop 25 for lower current limit $I_u$ being exceeded. Optionally a (third) detection signal E3 derived from this carries a logic "1" to second AND element 24.

When a current surge dI/dt is detected in differentiator 28, a binary code characterized by a second detection signal E2 is sent to inverting input 26 of second AND element 24. Timer stage 27 is started after detection of a current surge dI/dt. For the duration of a predefinable time (surge time) $t_{Spr}$, the corresponding binary code in AND element 24 is linked to detection signal E3. Because of the inversion of second detection signal E2, the output status of AND element 24 then goes only into an activated state and thus goes from logical "0" to logical "1" when there is no current surge dI/dt and current signal $I_n$ exceeds lower current limit $I_u$. If at the same time current signal $I_n$ is below upper current limit $I_o$ and voltage signal $U_n$ is below threshold $U_s$ (voltage drop), first AND element 20 goes from its initial condition into a trip condition where an output signal A is generated to block the remote protective function. In this case all the inputs of AND element 20 are logical "1." In other words, when the value drops below first threshold value $U_s$, a voltage drop $U_n<U_s$ is detected, and at the same time no current surge dI/dt leading to startup of timing element 27 is detected, and thus current signal $I_n$ is within current limits $I_u$, $I_o$, and output signal A is thus output as a blocking signal on the basis of the logical link of detection signals E1 and E2 in AND element 20.

At the same time, an alarm signal M is generated for the duration of a predefinable alarm time $t_{Mel}$, indicating a fault in measurement circuit 2, e.g., a short circuit or a line break in the voltage measuring circuit. In addition, an emergency signal N is also generated to activate an emergency protective function.

Detection of a current surge dI/dt indicates a network or system fault, and for the duration of surge time $t_{Spr}$ monitoring device 9 blocks the output of an output signal or blocking signal A. Blocking is accomplished by a second detection signal E2 because it carries a logical "0" to first AND element 20 on the basis of the inversion. Thus, the protective function of protective gear 1 can shut down a possible short circuit in line $L_n$ and thus in the network in the shortest possible time.

Due to the gating of detection signals E1 through E4, a line break in measurement circuit 2, in particular in the voltage measuring circuit, is also detected, a corresponding alarm signal M is generated, and unwanted tripping of protective gear 1 is prevented. If current signal $I_n$ is outside of predefinable current limits $I_u$, $I_o$, output of output signal A for blocking protective gear 1 is prevented in general because of the logic link of detection signals E1 through E4. Consequently, the protective function is always in effect when high operating currents $I_{Ln}$ occur (short-circuit current range). Therefore, unwanted blocking of the protective function when there is a line short circuit is reliably prevented. The protective function is also in effect in general at very low conductor currents $I_{Ln}$ and is not blocked by monitoring device 9. The de-energized condition of line segment $L_n$ is thus also taken into account.

Due to the feedback of output signal A via OR element 23, output signal A remains active regardless of the condition of detection signal E2 until the voltage drop has been corrected or current signal $I_n$ exceeds upper current limit $I_o$.

Figure 3:
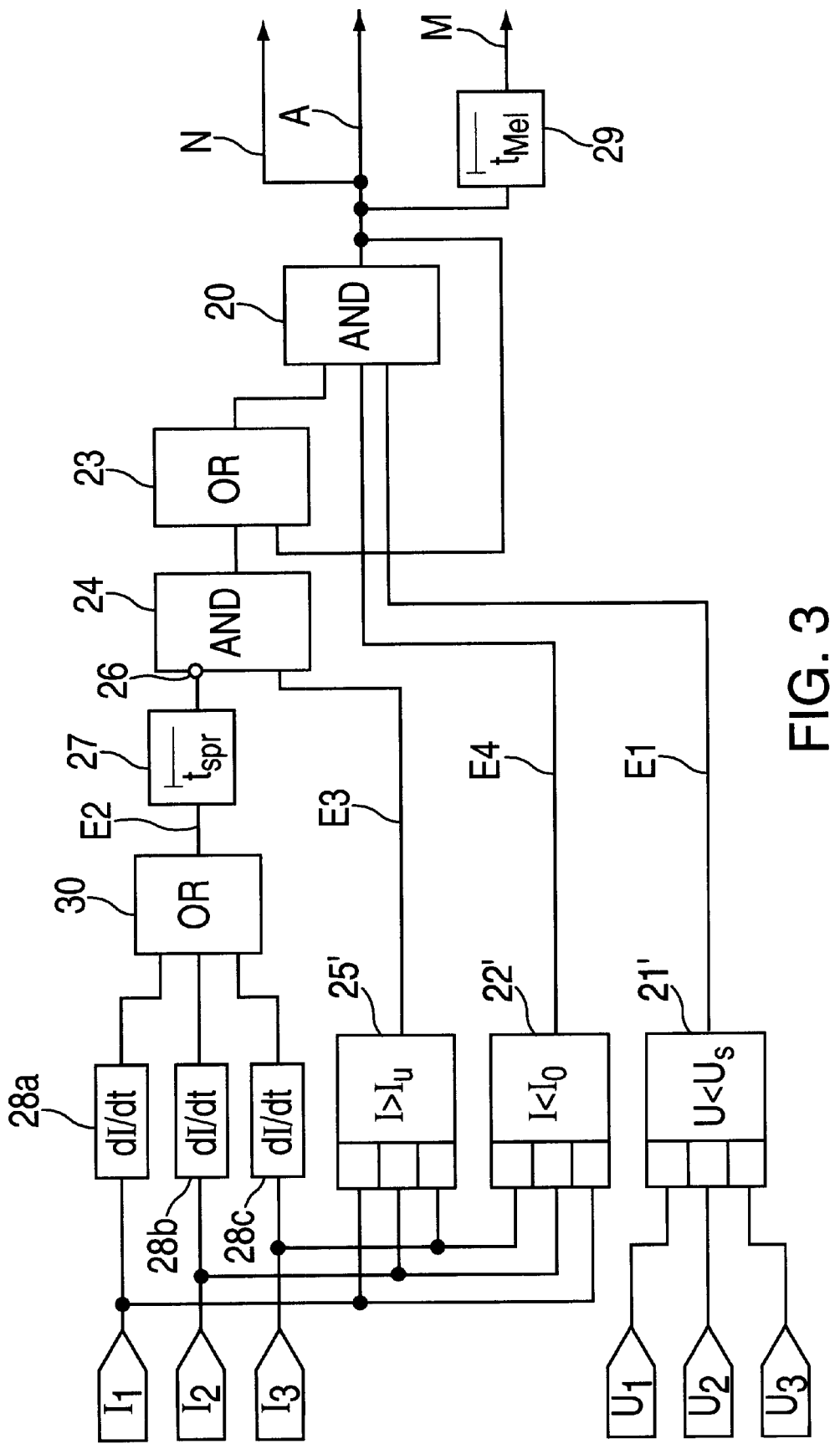
FIG. 3 shows the monitoring device for a three-phase network with a grounded neutral point.

FIG. 3 shows the gating of detection signals E1 through E4 in monitoring device 9 having a three-phase network with the corresponding three lines $L_1$ through $L_3$ to be monitored.

Corresponding voltage signals $U_1$ through $U_3$ and current signals $I_1$ through $I_3$ are derived according to phase from corresponding line voltages $U_{Ln}$ and line currents $I_{La}$ in measurement circuit 2 and sent separately over analog-digital converter 6 to monitoring device 9. In this case, a first flip-flop 21' is designed to have three channels, voltage signal $U_n$ of each phase being compared with a first threshold value $U_s$.

Current signals $I_1$ through $I_3$ are monitored in a similar manner for current limits $I_o$, $I_u$ being exceeded in flip-flop 22' and 25' having three channels. Current surge detection dI/dt is also designed with three channels, with one differentiating element 28a, 28b, 28c assigned to each phase. Differentiating elements 28a through 28c are connected to a common OR element 30 which in turn carries second detection signal E2 to inverting input 26 of second AND element 24 via timing element 27.

The remaining design and functioning of monitoring unit 9 correspond to those in the embodiment according to FIG. 2. Although monitoring device 9 is designed there for a single-phase network, the design of monitoring device 9 according to FIG. 3 takes into account current and voltage signals $I_n$ and $U_n$ of a two-phase or three-phase network having a grounded neutral point.

Figure 4:
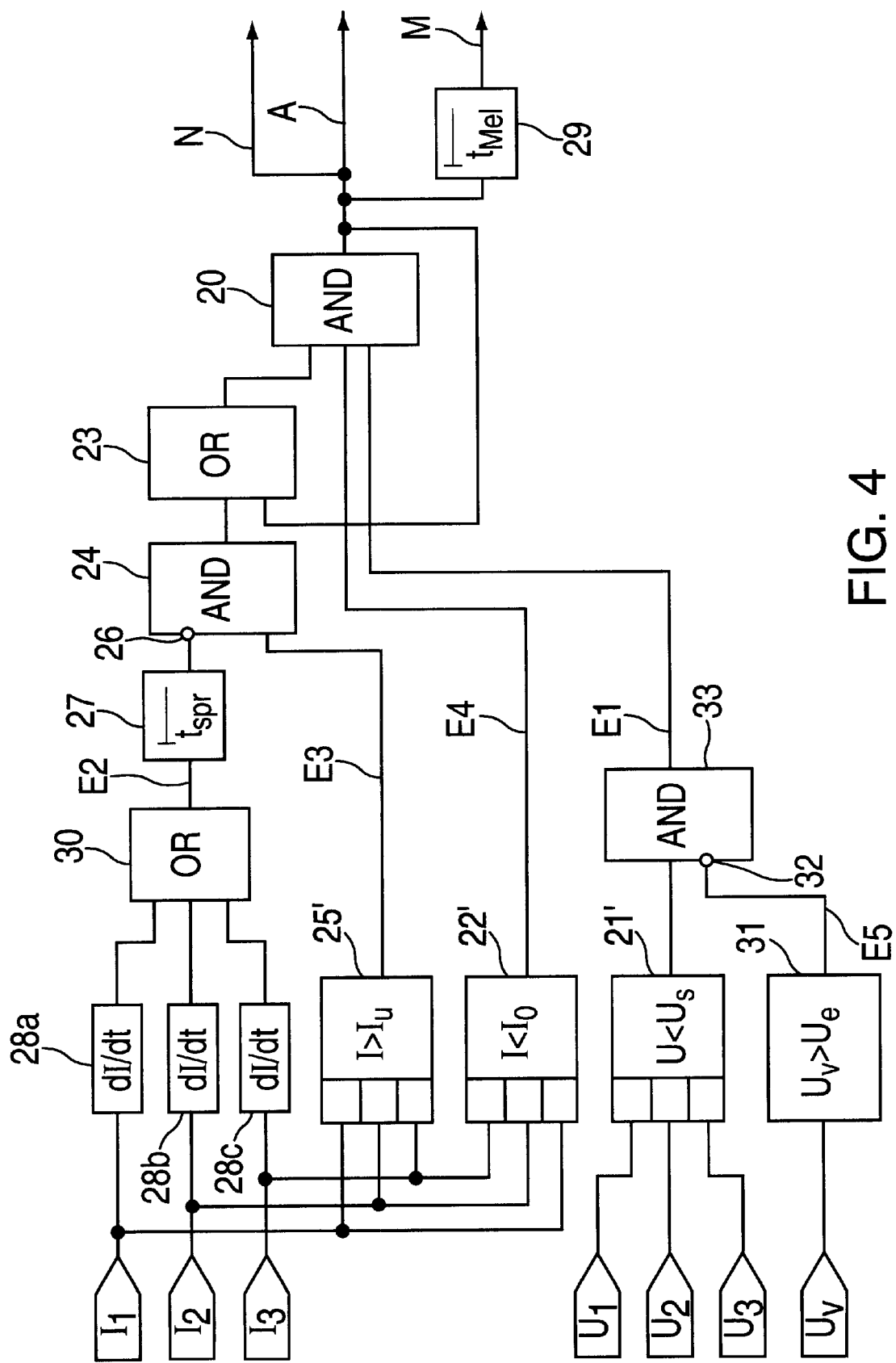
FIG. 4 shows the monitoring device for a three-phase network with a compensated or isolated neutral point.

According to FIG. 4, displacement voltage $U_v$ is also monitored for a three-phase network with insulated or compensated operation of the neutral point within monitoring device 9. To do so, an additional flip-flop 31 is provided, supplying a fifth detection signal E5 to an inverting input 32 of a third AND element 33. In addition, first detection signal E1 is sent to the input of this AND element. When a second predefinable threshold $U_e$ is exceeded, monitoring device 9 detects a single-pole fault in the network and blocks the generation and output of output signal A as a blocking signal.

If displacement voltage $U_v$ drops below threshold value $U_e$, first detection signal E1 is sent over AND element 33 to AND element 20, and an output signal A is again generated when no current surge has occurred in any of the phases ($L_1$ through $L_3$) and at the same time corresponding current signals $I_1$ through $I_3$ are within predefinable current limits $I_u$, $I_o$.

Similarly to the functioning of monitoring device 9 for a single-phase network, output signal A of monitoring device 9 is preferably used to block the protective function of protective gear 1 in the case of a multi-phase network as in the embodiments according to FIGS. 3 and 4. Output signal A is also used to generate an emergency signal N and thus to activate an emergency time-overcurrent protective function and to generate alarm signal M. In addition, monitoring device 9 drops back to its initial state regardless of the number of phases when a voltage recovery is detected on the basis of the fact that criterion $U>U_s$ is again met or current signal $I_n$ of each phase $L_{1...n}$ is below lower current limit $I_u$ (minimum current limit).

Monitoring device 9 may be used in single-phase networks or in multi-phase networks, regardless of how the neutral point is handled. A short circuit or an interruption, e.g., in the form of a line break in measurement circuit 2 of protective gear 1, is detected by monitoring device 9.

Monitoring device 9 in the embodiment according to FIG. 2 may be implemented with the following settings in an experiment using a Siemens model 7SA517 16 2/3 Hz overhead line protection device:

dI/dt=0.05 $I_N$/60 ms $I_o$=1.2 $I_N$ $I_u$=00.06 $I_N$ $t_{Spr}$=10 s $t_{Mel}$=5 s $U_S$=5 V, where $I_N$ represents the nominal operating current. In the embodiment according to FIG. 4, threshold value $U_S$=50 V was used as an additional parameter.

Gating a voltage drop ($U<U_s$) with a current surge dI/dt can be used in principle to detect and determine a measuring circuit voltage failure in a wide variety of protective gear in the medium-voltage and high-voltage range.

What is claimed is:

1. A method for monitoring a remote protective gear for an electric power grid, comprising:

deriving a voltage signal from a line voltage;

deriving a current signal from a line current deriving a first detection signal from the voltage signal when a voltage drop in the voltage signal is detected;

deriving a second detection signal from the current signal when a current surge in the current signal is detected;

comparing the current signal with an upper current limit;

deriving a fourth detection signal as a function of the comparison of the current signal with the upper current limit; and generating an output signal to prevent a tripping of the protective gear when the first detection signal and the fourth detection signal are present.

2. A method for monitoring a remote protective gear for an electric power grid, comprising:

deriving a voltage signal from a line voltage;

deriving a current signal from a line current;

deriving a first detection signal from the voltage signal when a voltage drop in the voltage signal is detected;

deriving a second detection signal from the current signal when a current surge in the current signal is detected;

expanding in time and inverting the second detection signal;

comparing the current signal with an lower current limit;

deriving a third detection signal as a function of the comparison of the current signal with the lower current limit; and generating an output signal to prevent a tripping of the protective gear when only the first detection signal and the third detection signal are present.

3. The method according to claim 2, further comprising:

comparing the current signal with an upper current limit;

deriving a fourth detection signal as a function of the comparison of the current signal with the upper current limit; and generating the output signal to prevent a tripping of the protective gear when the first detection signal, the third detection signal and the fourth detection signal are present.

4. The method according to claim 2, further comprising:

generating one of: i) an emergency signal for activating an emergency protective function, and ii) an alarm signal, when the output signal is generated to prevent a tripping of the protective gear.

5. The method according to claim 2, further comprising:

detecting the current surge according to phase; and generating the second detection signal as a function of the detected current surge using an OR gate.

6. The method according to claim 2, wherein the grid is a three-phase grid having an insulated or compensated neutral point, the method further comprising:

generating a fifth detection signal as a function of a comparison of a displacement voltage with a second threshold value; and gating the fifth detection signal with the first detection signal so that generation of the output signal is prevented when the second threshold value is exceeded.

7. The method according to claim 2, further comprising:

deactivating the output signal generated for preventing a tripping of the protective gear when one of:
   i) the voltage signal exceeds a first threshold value,
   ii) the current signal is below a lower current limit, and iii) the current signal exceeds an upper current limit.

8. A remote protective gear for an electric grid, the protective gear receiving a voltage signal derived from a line voltage via a measurement circuit and receiving a current signal derived from a line current, comprising:

a monitoring device connected to the measurement circuit, the monitoring device deriving a first detection signal from the voltage signal for a voltage drop in the voltage signal and deriving a second detection signal from the current signal for a current surge in the current signal, the monitoring device including a first AND element for gating the first detection signal with the second detection signal and a second AND element for gating the first detection signal with a third detection signal, the third detection signal being derived from a different between the current signal and a lower threshold, the monitoring device generating an output signal for preventing a tripping of the protective gear.

9. The protective gear according to claim 8, wherein the first AND element gates the first detection signal and the second detection signal with a fourth detection signal, the fourth detection signal being derived from a difference between the current signal and an upper threshold value.

10. The protective gear according to claim 8, wherein the monitoring device includes a timing element for expanding the second detection signal.

11. The protective gear according to claim 10, wherein an output of the first AND element is connected to an OR element, an input of the OR element is connected to the second AND element, an output of the second AND element is connected to the first AND element.

12. The protective gear according to claim 8, wherein an output of the monitoring device is connected to a second timing element for expanding in time an alarm signal derived from a gating operation.

13. The protective gear according to claim 8, wherein the monitoring device includes a plurality of differentiating elements for phase detection of the current surge, an OR element being connected downstream from the differentiating elements in a multi-phase grid.

14. The protective gear according to claim 8, wherein the monitoring device includes a third AND element for gating the second detection signal with a fifth detection signal, the fifth detection signal being derived from a comparison of a displacement voltage with a second threshold value, the protective gear being in a multi-phase grid having an insulated or compensated neutral point.

* * * * *